(12) United States Patent
Dawson et al.

(10) Patent No.: US 9,075,901 B2
(45) Date of Patent: Jul. 7, 2015

(54) SYSTEM AND METHOD TO VISUALIZE ACTIVITIES THROUGH THE USE OF AVATARS

(75) Inventors: Christopher J. Dawson, Arlington, VA (US); Michael J. Osias, Westtown, NY (US); Brian W. Sledge, Shreveport, LA (US)

(73) Assignee: International Business Machines Corporation, Armonk, NY (US)

( * ) Notice: Subject to any disclaimer, the term of this patent is extended or adjusted under 35 U.S.C. 154(b) by 1062 days.

(21) Appl. No.: 12/334,850

(22) Filed: Dec. 15, 2008

(65) Prior Publication Data

US 2010/0153869 A1 Jun. 17, 2010

(51) Int. Cl.
*G06F 11/32* (2006.01)

(52) U.S. Cl.
CPC ......... *G06F 11/323* (2013.01); *A63F 2300/535* (2013.01); *A63F 2300/5553* (2013.01)

(58) Field of Classification Search
CPC .......... G06F 3/04815; G06F 17/30873; G06F 11/323; A63F 2300/69; A63F 2300/535; A63F 2300/5553
USPC ................. 715/757, 772, 706, 736, 748–749, 715/769–770
See application file for complete search history.

(56) References Cited

U.S. PATENT DOCUMENTS

| | | | | |
|---|---|---|---|---|
| 5,261,044 A * | 11/1993 | Dev et al. | ....................... | 715/855 |
| 5,483,631 A * | 1/1996 | Nagai et al. | ................... | 715/736 |
| 5,884,029 A * | 3/1999 | Brush et al. | ................... | 709/202 |
| 5,886,697 A * | 3/1999 | Naughton et al. | ............ | 345/473 |
| 5,889,520 A * | 3/1999 | Glaser | ........................... | 715/853 |
| 5,889,951 A * | 3/1999 | Lombardi | ..................... | 709/219 |
| 5,907,328 A | 5/1999 | Brush, II et al. | | |
| 5,926,177 A * | 7/1999 | Hatanaka et al. | ............ | 715/747 |
| 5,946,002 A * | 8/1999 | Lowry | ......................... | 345/474 |
| 5,953,010 A * | 9/1999 | Kampe et al. | ................ | 715/772 |
| 6,032,122 A * | 2/2000 | Gertner et al. | ............... | 715/772 |
| 6,097,390 A * | 8/2000 | Marks | ........................... | 715/772 |
| 6,151,643 A * | 11/2000 | Cheng et al. | .................... | 710/36 |
| 6,229,533 B1 * | 5/2001 | Farmer et al. | ................. | 345/473 |
| 6,275,987 B1 * | 8/2001 | Fraley et al. | ..................... | 717/127 |
| 6,621,508 B1 * | 9/2003 | Shiraishi et al. | .............. | 715/810 |
| 7,047,092 B2 * | 5/2006 | Wimsatt | ........................... | 700/83 |
| 7,058,897 B2 * | 6/2006 | Matsuda | ....................... | 715/758 |
| 7,073,129 B1 * | 7/2006 | Robarts et al. | ................ | 715/740 |
| 7,137,074 B1 * | 11/2006 | Newton et al. | ................ | 715/835 |
| 7,227,976 B1 | 6/2007 | Jung et al. | | |

(Continued)

OTHER PUBLICATIONS

Kiss et al., "Viewpoint Adaptation during Navigation based on Stimuli from the Virtual Environment", ACM, 2003, pp. 19-26.

(Continued)

*Primary Examiner* — Amy Ng
*Assistant Examiner* — William Wong
(74) *Attorney, Agent, or Firm* — Lisa J. Ulrich; Roberts Mlotkowski Safran & Cole, P.C.

(57) ABSTRACT

A system and method to visualize activities through the use of avatars. The system includes a display engine configured to display at least one automated activity as an avatar. The system also includes a management system configured to monitor the progress of the at least one automated activity and alter at least one of an appearance and a movement of the avatar in relation to the progress of the at least one automated activity.

26 Claims, 4 Drawing Sheets

(56) References Cited

U.S. PATENT DOCUMENTS

| | | | |
|---|---|---|---|
| 7,508,310 B1* | 3/2009 | Light et al. | 340/573.1 |
| 7,640,757 B2* | 1/2010 | Lee | 62/129 |
| 7,830,396 B2* | 11/2010 | Lindberg et al. | 345/581 |
| 2001/0043233 A1* | 11/2001 | Sato et al. | 345/706 |
| 2001/0055017 A1* | 12/2001 | Ording | 345/440 |
| 2002/0012011 A1* | 1/2002 | Roytman et al. | 345/736 |
| 2002/0090985 A1* | 7/2002 | Tochner et al. | 463/1 |
| 2003/0076341 A1* | 4/2003 | Kuki | 345/700 |
| 2003/0077556 A1* | 4/2003 | French et al. | 434/258 |
| 2003/0132949 A1* | 7/2003 | Fallon et al. | 345/700 |
| 2003/0137541 A1* | 7/2003 | Massengale et al. | 345/764 |
| 2003/0163478 A1* | 8/2003 | Kirkland | 707/102 |
| 2003/0200347 A1* | 10/2003 | Weitzman | 709/310 |
| 2004/0075677 A1* | 4/2004 | Loyall et al. | 345/706 |
| 2004/0179038 A1* | 9/2004 | Blattner et al. | 345/751 |
| 2004/0207662 A1* | 10/2004 | Anderson et al. | 345/772 |
| 2004/0243533 A1* | 12/2004 | Dempster et al. | 707/1 |
| 2005/0044500 A1* | 2/2005 | Orimoto et al. | 715/706 |
| 2005/0102667 A1* | 5/2005 | Barta et al. | 717/174 |
| 2005/0109048 A1* | 5/2005 | Lee | 62/126 |
| 2005/0171997 A1* | 8/2005 | Seo et al. | 709/202 |
| 2005/0193348 A1* | 9/2005 | Nunez et al. | 715/772 |
| 2006/0064645 A1* | 3/2006 | Neven et al. | 715/753 |
| 2006/0080103 A1* | 4/2006 | Van Breemen | 704/270 |
| 2006/0089543 A1* | 4/2006 | Kim et al. | 600/300 |
| 2006/0166708 A1* | 7/2006 | Kim et al. | 455/573 |
| 2006/0248159 A1* | 11/2006 | Polan | 709/208 |
| 2006/0265664 A1* | 11/2006 | Simons et al. | 715/772 |
| 2007/0038963 A1* | 2/2007 | Moore | 715/859 |
| 2007/0039333 A1* | 2/2007 | Son et al. | 62/129 |
| 2007/0050715 A1* | 3/2007 | Behar | 715/706 |
| 2007/0107754 A1* | 5/2007 | Jeong et al. | 134/58 D |
| 2007/0113181 A1* | 5/2007 | Blattner et al. | 715/706 |
| 2007/0192723 A1* | 8/2007 | Anzelde et al. | 715/772 |
| 2007/0218987 A1* | 9/2007 | Van Luchene et al. | 463/30 |
| 2007/0260984 A1* | 11/2007 | Marks et al. | 715/706 |
| 2008/0133653 A1* | 6/2008 | Fok et al. | 709/203 |
| 2008/0158232 A1* | 7/2008 | Shuster | 345/474 |
| 2008/0168376 A1* | 7/2008 | Tien et al. | 715/772 |
| 2008/0178633 A1* | 7/2008 | Jeong et al. | 68/12.23 |
| 2008/0195944 A1* | 8/2008 | Lee et al. | 715/706 |
| 2008/0250315 A1* | 10/2008 | Eronen et al. | 715/706 |
| 2008/0268418 A1* | 10/2008 | Tashner et al. | 434/365 |
| 2008/0301556 A1* | 12/2008 | Williams et al. | 715/706 |
| 2009/0007346 A1* | 1/2009 | Ha et al. | 8/159 |
| 2009/0037822 A1* | 2/2009 | Kandekar et al. | 715/733 |
| 2009/0040231 A1* | 2/2009 | Sano et al. | 345/474 |
| 2009/0055824 A1* | 2/2009 | Rychtyckyj et al. | 718/101 |
| 2009/0064052 A1* | 3/2009 | Mihalcheon | 715/850 |
| 2009/0144639 A1* | 6/2009 | Nims et al. | 715/757 |
| 2009/0300525 A1* | 12/2009 | Jolliff et al. | 715/764 |
| 2010/0115426 A1* | 5/2010 | Liu et al. | 715/757 |
| 2010/0121763 A1* | 5/2010 | Vasudevan et al. | 705/39 |

OTHER PUBLICATIONS

Cox et al., "AI for Automated Combatants in a Training Application", Proceedings of the Second Australasian Conference on Interactive Entertainment, pp. 57-64.

Quax et al., "Using Autonomous Avatars to Simulate a Large-Scale Multi-User Networked Virtual Environment", ACM, 2004, pp. 88-94.

Cuddihy et al., "Embodied Interaction in Social Virtual Environments", CVE 2000, pp. 181-188.

Kerr et al., "Buddy bots: How Turing's fast friends are undermining consumer privacy", INSPEC, 2005, vol. 14, No. 6, pp. 647-655.

Elliott et al., "Autonomous Agents as Synthetic Characters", AI Magazine, vol. 19, No. 2, 1998, pp. 13-30.

* cited by examiner

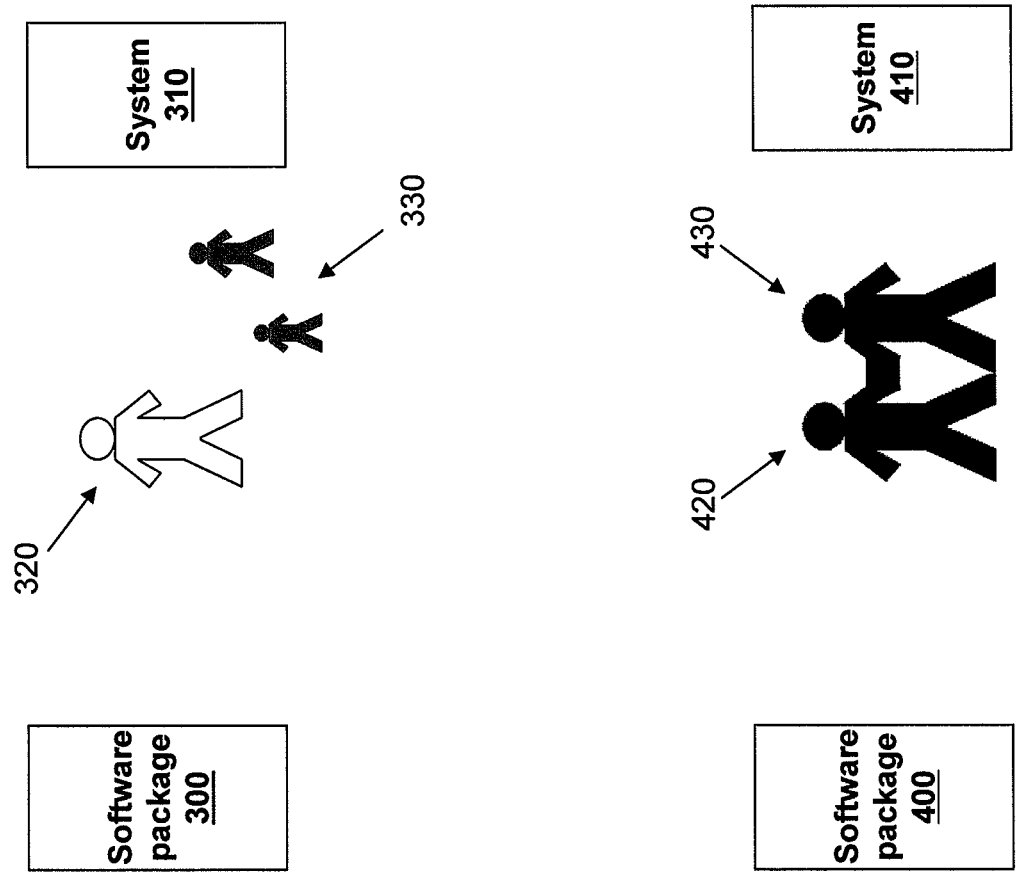

SYSTEM AND METHOD TO VISUALIZE ACTIVITIES THROUGH THE USE OF AVATARS

FIELD OF THE INVENTION

The invention generally relates to a system and method for visualizing activities and, in particular, to visualizing activities through the use of avatars in a virtual universe.

BACKGROUND OF THE INVENTION

A virtual universe (VU) is an interactive simulated environment accessed by multiple users through an online interface. Users inhabit and interact in the VU via avatars, which are a user's representation of himself or herself. These representations can be in the form of a three-dimensional model, a two-dimensional icon, a text construct, a user screen name, etc. Although there are many different types of VUs, there are several features many VUs generally have in common. These features include, for example, Shared Space: the VU allows many users to participate at once;
Graphical User Interface: the VU depicts space visually, ranging in style from 2D "cartoon" imagery to more immersive 3D environments;
Immediacy: interaction takes place in real time;
Interactivity: the VU allows users to alter, develop, build, or submit customized content;
Persistence: the VU's existence continues regardless of whether individual users are logged in; and
Socialization/Community: the VU allows and encourages the formation of social groups such as teams, guilds, clubs, cliques, housemates, neighborhoods, etc.

Any number of computer programs may be executed in a VU and/or the real world. Typically, these computer programs are difficult to implement and/or monitor unless the person implementing and/or monitoring them has technical knowledge about the computer program. However, obstacles can arise even when the person has the requisite technical knowledge. For example, the person may have to go through a series of logins to a console or other computer terminal to check the progress of the computer programs and ensure that there are no problems. Understandably this can be time consuming and require a number of resources.

SUMMARY OF THE INVENTION

In a first aspect of the invention, a system comprises a display engine configured to display at least one automated activity as an avatar. The system also comprises a management system configured to monitor the progress of the at least one automated activity and alter at least one of an appearance and a movement of the avatar in relation to the progress of the at least one automated activity.

In another aspect of the invention, a computer implemented method for visualizing one or more automated activities comprises installing a monitoring agent in the one or more automated activities and representing the one or more automated activities via at least one avatar. The computer implemented method further comprises monitoring the at least one avatar and altering the at least one avatar to reflect a change in the one or more automated activities.

In another aspect of the invention, a computer program product comprising a computer usable medium having readable program code embodied in the medium is provided. The computer program product includes at least one component operable to: depict one or more automated activities via at least one avatar; monitor a progress of the one or more automated activities through the at least one avatar; and change one or more features of the at least one avatar to reflect the progress of the one or more automated activities.

In yet another aspect of the invention, a method for enhancing accessibility in a virtual universe, comprises providing a computer infrastructure being operable to: providing a computer infrastructure being operable to: associate one or more automated activities with at least one avatar; monitor a status of the one or more automated activities through a monitoring agent; and display the status of the one or more automated activities via the at least one avatar.

BRIEF DESCRIPTION OF THE DRAWINGS

The present invention is described in the detailed description which follows, in reference to the noted plurality of drawings by way of non-limiting examples of exemplary embodiments of the present invention.

FIGS. 3-6 show exemplary embodiments in accordance with aspects of the invention.

DETAILED DESCRIPTION OF THE INVENTION

Figure 1:
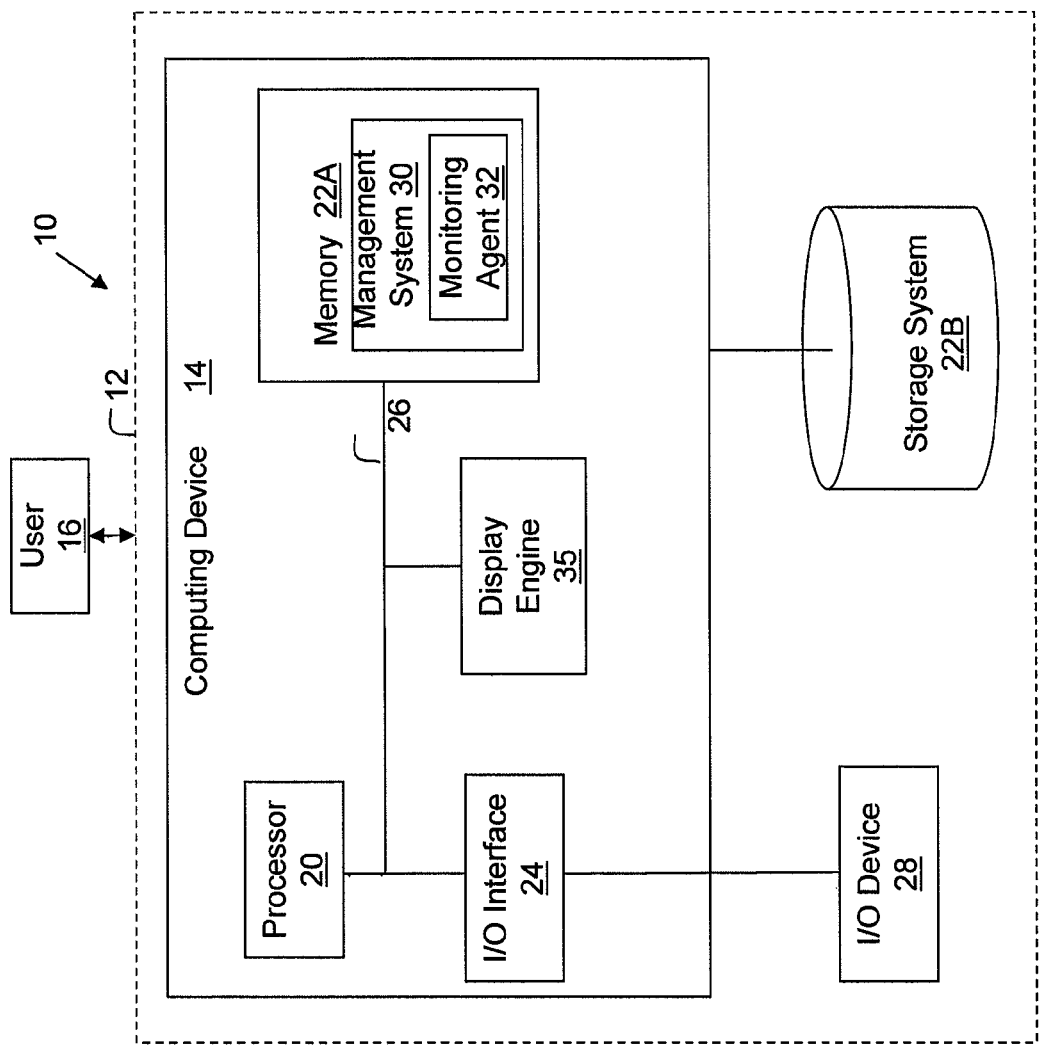
FIG. 1 shows an illustrative environment for implementing the steps in accordance with the invention.

The invention is directed to a system and method for visualizing activities and, in particular, to visualizing activities through the use of avatars in a VU. More specifically, the present invention provides a system and method to visualize the execution and operation of one or more automated activities within a VU through the use of one or more computer controlled avatars.

Real world environments may be rendered in a VU. Exemplary environments may include, e.g., datacenters, information technology (IT) environments, etc. A number of activities that would occur within the real world environment may also be rendered within the VU. For example, the automated provisioning of activities in a real world IT environment may be rendered in the VU. In embodiments, these automated activities may be rendered using one or more avatars, which are configured to represent a user, such as an administrator, and/or one or more automated activities. The avatars may be rendered in varying sizes, species, colors, etc., depending on the importance of the program, the criticality of a program, whether the program is currently running or inactive, etc.

By representing automated activities via avatars, administrators can quickly and easily visualize and monitor the progress of the automated activities. Exemplary observations may include, for example: the number and types of automated activities that are currently occurring; the progress of each automated activity; the system or component that the automated activity is communicating with; and/or any problems or exceptions during the automated execution of the activity; etc.

For example, an administrator may instruct one or more avatars to execute an automated activity for installing software. The instruction may include, e.g., what avatars are associated with the automated activity, what computer system(s) the automated activity should occur on, when the automated activity should occur, etc. In embodiments, the instruction may be given to the avatar by an administrator by, e.g., selecting the avatar, issuing a command to the avatar, and/or handing a virtual representation of the automated activity to the avatar, etc.

The progress and/or status of the automated activity may be visually represented by the one or more avatars that are implementing the automated activity. Exemplary visualizations may include, e.g., the avatar running from a first object in a VU to a second object in the VU, wherein the first object may be a virtual representation of the program that is being installed and the second object may be a virtual representation of the computer system on which the program is being installed. In embodiments, the speed in which the avatar runs from the first object to the second object may be representative of the speed in which the program is being installed.

The number, location, color, type, size, etc., of avatars being used to implement the automated activity may be representative of a number of activities. For example, the number of computer controlled avatars may represent the number of automated activities currently being executed in the VU environment. Additionally, the location of the computer controlled avatars may represent the communications of the provisioning scripts with different systems. In embodiments, the color of the avatars may represent, e.g., the progress or number of errors that occurred during the execution of the automated activity. The type and/or size of the avatars may represent the importance of the automated activities. For example, an automated activity represented by a small ant avatar may be less important than an automated activity represented by a large human avatar.

The administer may "watch" the automated activities being executed by walking around the virtual environment or by watching the automated activities from a birds-eye-view like a factory manager overlooking a factory floor. By allowing the administrator to visually monitor the automated activities, the administrator can quickly identify and correct any problems that may occur during the execution and implementation of the automated activities.

Accordingly, the invention provides one or more computer generated and controlled avatar that visually represents the execution and progress of automated activities. This beneficially provides users with a quick and easy mechanism to understand automated activities that are currently in progress.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
a portable computer diskette,
a hard disk,
a random access memory (RAM),
a read-only memory (ROM),
an erasable programmable read-only memory (EPROM or Flash memory),
a portable compact disc read-only memory (CDROM),
an optical storage device, and/or
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a Management System 30, which may be embodied in a memory 22A. The Management System 30 is configured to initiate, install, monitor, track, and/or test, etc., an automated activity. In embodiments, the Management System 30 may comprise a Monitoring Agent 32. Moreover, in embodiments, the Management System 30 may be controlled by a user 16.

The computing device 14 may further comprise a Display Engine 35 configured to display one or more virtual objects, avatars, and/or features in a virtual environment. The Display Engine 35 may be further configured to display interactions that may occur between the objects and/or avatars. This may be performed, e.g., in real time, upon the happening of an event, or synchronously. By utilizing the Management System 30 and the Display Engine 35, automated activities may be visualized through the use of avatars in accordance with the invention, e.g., process described herein.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc.

In general, the processor 20 executes computer program code, which is stored in the memory 22A and/or storage system 22B. The computer code may be representative of the functionality of the Management System 30 and the Display Engine 35. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary Implementation of the System

The present invention is described below with reference to a flowchart illustration and/or block diagram of methods, apparatus (systems) and computer program products according to embodiments of the invention. It will be understood that each block of the flowchart illustrations and/or block diagram, and combinations of blocks in the flowchart illustration and/or block diagram, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
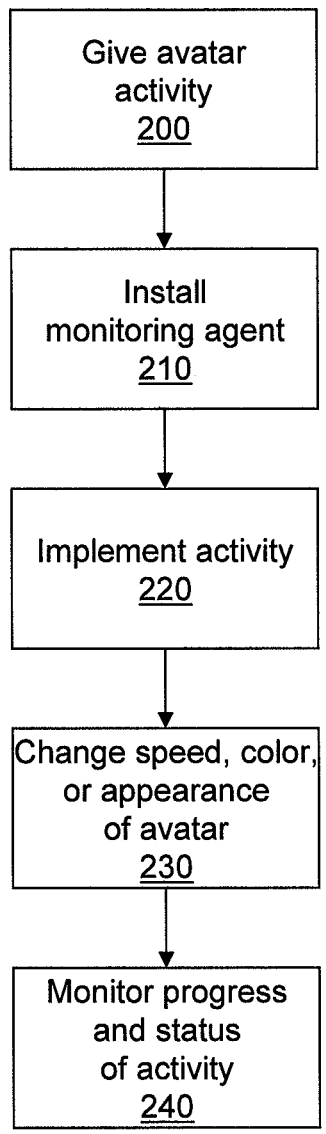
FIG. 2 shows a flow chart of an exemplary process in accordance with aspects of the invention.

The flowchart and block diagram in FIG. 2 illustrates the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 2 shows a flow chart of an exemplary process according to embodiments of the invention. In particular, FIG. 2 illustrates an exemplary process for visualizing and tracking activities through the use of avatars. At step 200, an administrator, user, controller, etc., may give an avatar an automated activity. Exemplary automated activities may include, but are not limited to: computer programs; automated scripts; automated mechanical interactions; and/or biological activities; etc. The computer programs may include, e.g., computer applications being executed on a computer system. The automated scripts may include, e.g., automated software provisioning scripts. In embodiments, the automated mechanical interactions may include, e.g., the workings of a clock or mechanical telephone exchange. Moreover, the biological activities may include, e.g., an antidote being injected into a body to counterattack poison.

One or more of the automated activities may be given to any number of avatars that are currently performing an automated activity or are inactive. In embodiments, inactive avatars may be located indiscriminately throughout the VU, may be located at a designated area within the VU, and/or may be represented as a single avatar, etc. The automated activity may be given to an avatar by clicking on, pointing to, or otherwise selecting the avatar. Additionally, in embodiments, the automated activity may be given to the avatar by shaking hands with the avatar, hugging the avatar, handing the avatar a virtual representation of the activity, issuing a command to the avatar, or other interactions.

It should be understood by those of skill in the art that each component that is affected by the automated activity should be rendered in the VU. For example, an automated activity to provision software to a computer system may affect both a computer system and a software package. Thus, both the computer system and the software package should be represented as virtual objects in the VU. In embodiments having activities that cross multiple components, both the source and destination computer system can be represented in the virtual world. Thus, for example, embodiments moving data from a first computer system to a second computer system can represent both computer systems in the VU.

In embodiments, one or more of the virtual objects and/or avatars may be segmented into different locations within the virtual environment. This segmentation may be based on, e.g., the type of activity, object, priority, etc., associated with the object. For example, computer systems running accounting and/or finance software programs may be segmented to a first part of the virtual environment whereas software programs relating to advertising and/or marketing may be segmented to a second part of the virtual environment. Similarly, the objects that represent high speed servers may be segmented to a first part of the virtual environment whereas servers having lower computational powers may be segmented to a second part of the virtual environment. Understandably, any number of segmentation schemes, beyond those listed herein, may be used to segment virtual objects and/or avatars within a single or a plurality of virtual environments.

At step 210, a monitoring agent (such as the Monitoring Agent 32 described in FIG. 1) may be installed in one or more automated activities so that the automated activities can be tracked in the VU. The monitoring agent may be embodied as any number of tracking programs known to those skilled in the art. For example, embodiments may install trace codes in one or more of the automated activities for monitoring purposes.

In embodiments, the monitoring agent may be installed on one or more avatars instead of or in addition to being installed in an automated activity. This limits the frequency in which a monitoring agent need be installed and also provides an administrator with a mechanism to easily track inactive avatars within the VU.

The automated activity may be visually implemented by an avatar, at step 220. The visual implementation by the avatar is configured to represent the real world implementation of the automated activity. This allows the progress and/or status of the real world automated activity to be easily relayed in a VU environment and monitored by an administrator, user, controller, etc. In embodiments, one or more changes may be made to the avatar before, after, and/or while the automated activity is being implemented in order to provide the administrator with an easy way to visualize the progress and/or status of the automated activity.

Changes may be made to an avatar that affect the avatar's movements, color, appearance, etc., at step 230. The changes may be made automatically or periodically upon a happening of an event. In embodiments, one or more of these changes may be performed using a management system (such as the Management System 30 described in FIG. 1). These changes are configured to provide a simple and easy way for administrators, users, controllers, etc., to visualize activities through the use of avatars.

Exemplary changes that may be applied to the avatar may include changes in an avatar's speed and/or movements. For example, an avatar may move from a first object, such as a software package, to a second object, such as a computer system. The speed at which the avatar "runs" or otherwise moves between the objects may be proportional to the speed at which the automated activity is being executed in the real world. Thus, an avatar that is running quickly to an object may be performing an automated activity faster than an avatar that is walking to the same or a different object. In embodiments where an automated activity is being executed over a certain speed, the avatar may make one or more movements to indicate the speed in which the automated activity is being performed. For example, an avatar may make gestures such as fast hand movements when an automated activity is being executed over a certain speed. Moreover, in embodiments, other visual information, such as changing the color of the avatar, may be used to indicate that an automated activity is being executed over a certain speed.

In embodiments, the color and/or appearance of an avatar may change based on the type of automated activity being represented. For example, an avatar could wear an apron, shirt, hat, etc., bearing the name of the automated activity that is being implemented. Moreover, in embodiments, the avatar could change color depending on the type of automated activity being implemented, the importance of the automated activity, etc.

Embodiments may also change the color and/or appearance of an avatar based on the percentage of an automated activity that is complete. For example, an automated activity that has just begun may be represented by a certain color of avatar, whereas, an automated activity that is near completion may be represented by another color of avatar. The percentage complete may also be represented visually as text, symbols, graphics, etc., which may be located above the head of the avatar or otherwise proximately to the avatar.

Changes in the color and/or appearance of an avatar may be based on the number of errors or exceptions raised during the automated activity. For example, in embodiments, the avatar could turn a color if more than a specified number of errors have been detected during a predetermined time period and/or during the entire execution of an automated activity. In embodiments, the avatar may make a gesture indicating that more than a specified number of errors have occurred. The number of permitted errors may be different between automated activities and may be broken down to fatal or nonfatal errors, i.e., errors that are likely to cause severe harm or errors that do not affect the implementation of the automated activity.

In embodiments, the color and/or appearance of an avatar may change based on the criticality of the automated activity. For example, a certain color of avatar may be used to represent "business as usual activities", whereas, another color of avatar may be used to represent mission critical activities or emergency automation activities. Moreover, in embodiments, the avatar may wear a shirt, hat, and/or other item bearing an indicator that says the activity is a normal business activity or an emergency activity.

The changes made to the avatar may be monitored and information on the status and/or progress may be collected, at step 240. For example, information relating to the current program counter location, the current location of the activity, the percentage progress of the automated activity, and/or the number of errors detected with the activity, etc., may be collected. This information may be used to monitor the progress of one or more automated activities. In embodiments, a legend, caption, key, or the like may be included to indicate the meaning of one or more of an avatar's movements, colors, and/or appearances.

Monitoring the progress of an automated activity and/or other information associated with the automated activity may be event driven or synchronous. Event driven information may be generated when an event happens, e.g., asynchronous. For example, event driven information may be generated when an event occurs such as hitting a specific milestone within the execution of the activity. Contrarily, synchronous activity may be generated after a predetermined period of time has elapsed. For example, an activity may be polled for progress every x number of seconds. In embodiments, information associated with the automated activity may be fed into the VU using any number of technologies known to those skilled in the art.

While a number of steps have been described herein, it should be understood by those skilled in the art that embodiments may utilize fewer and/or additional steps. For example, additional steps may be included to allow a user to ask an avatar questions regarding the automated activity, how many errors the avatar has detected, where the errors have occurred, what automated activities are consuming the most resources, etc. Moreover, in embodiments a step may be included to ascertain how many resources each avatar has available prior to and/or after giving the avatar an automated activity.

EXEMPLARY EMBODIMENTS

FIGS. 3-6 show exemplary embodiments of the invention in accordance with aspects of the invention. In particular, FIG. 3 includes a software package object 300 and a system object 310. A software package, which is associated with software package object 300, is illustratively being installed on a system, which is associated with system object 310.

The progress and/or status of, e.g., installing one or more components from the software package onto the system object 310 may be monitored through avatar 320. For example, as avatar 320 is approximately halfway between the software package object 300 and the system object 310, an administrator may infer that the installation is approximately halfway complete. Moreover, as the avatar 320 is rather large, the administrator may infer that the installation is large, the priority of the installation is large, and/or the number of target machines that the software is being installed on is large, etc.

In embodiments the software package may include one or more smaller components, which may be monitored through avatars 330. These smaller components may be part of the original software package, part of a separate software package, etc., and may be used to aid in the installation process. The avatars 330 implementing these smaller components may be represented as a different color than avatar 320 to indicate that a separate component is being installed.

FIG. 4 includes a software package object 400, a system object 410, and two avatars 420 and 430. The avatars 420 and 430 represent one or more automated activities, which are being implemented. In embodiments, the avatars 420 and 430 may communicate with each other. For example, avatar 420 may implement a provisioning script as part of a software package. When the script is finished, another automated activity may be begun by avatar 430 to configure the newly installed software.

In embodiments, both avatars 420 and 430 may be rendered before the automated activities are executed. Thus, for example, when the first automated activity is executed, the avatar 420 associated with the executed activity may move a specified distance from the software package object 400 to the system object 410 and the second avatar 430 associated with the second automated activity may remain still. When the first activity is complete, the first avatar 420 may interact with the second avatar 430 using, e.g., a gesture, to visually represent the hand off, i.e., the end of the first automated activity and the beginning of the second automated activity. Exemplary gestures may include, but are not limited to, shaking hands, hugging, saying "go", etc. Once the hand off is complete, embodiments may have the first avatar 420 remain still while the second avatar 430 begins moving toward the system object 410.

Both avatars 420 and 430 involved in the hand off may be continuously visible to the administrator before and after the hand off. However, in embodiments, only the avatar actively implementing the automated activity may be displayed. For example, the first avatar 420 may be visible when implementing the automated activity and become invisible after the first avatar 420 hands off to the second avatar 430. Likewise, the second avatar 430 may be invisible until shortly before the first avatar 420 hands off to the second avatar 430.

Figure 5:
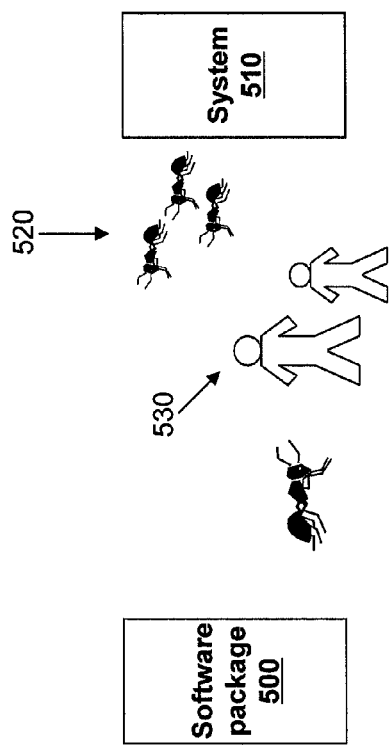

FIG. 5 includes a software package object 500, a system object 510, and a plurality of avatars 520 and 530. In particular, FIG. 5 includes avatars 520, which are depicted as moving away from the system object 510 to the software package 500. In embodiments, this may illustrate to the administrator that the avatars 520 are implementing an automated activity from the system object 510, such as, e.g., a response script.

FIG. 5 also includes avatars 530, which are represented as human avatars. In embodiments, this may illustrate to the administrator that the automated activity is important and/or noteworthy. Contrarily, avatars 520 are depicted as ant avatars. In embodiments, this may illustrate to the administrator that the automated activities represented by the ant avatars 520 are less important and/or are minor automated activities. By using one or more different species of avatars, the administrator, controller, etc., can easily visualize the importance of the automated activity as well as the progress and/or status of the automated activity. Understandably, while human and ant avatars are depicted herein, those skilled in the art may use any number of species of avatars including various animals, objects, people, etc., to represent one or more of the automated activities.

Figure 6:
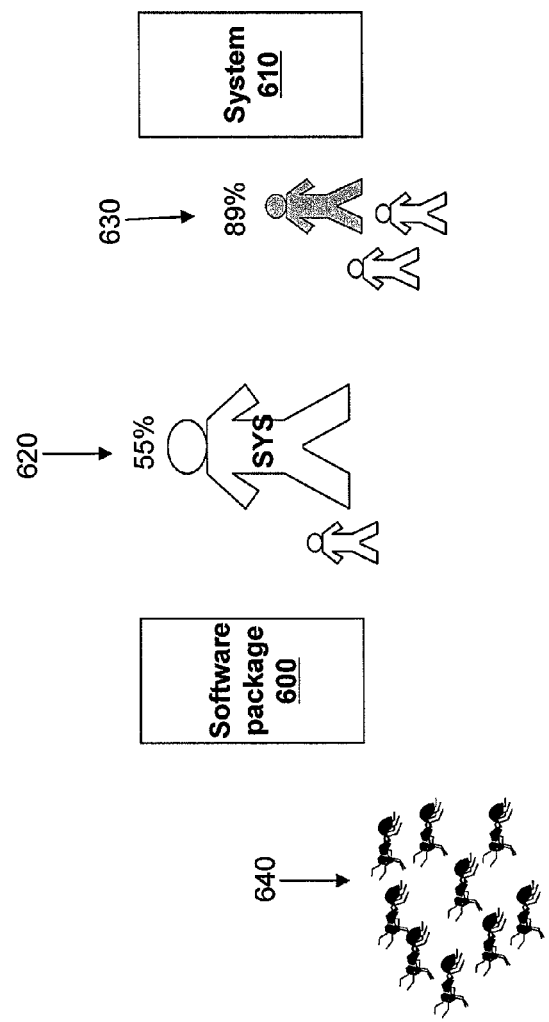

FIG. 6 includes a software package object 600, a system object 610, and a plurality of avatars 620, 630, and 640. In particular, FIG. 6 illustrates a first automated activity that is represented by avatar 620, which is wearing the word "SYS". In embodiments, this may be indicative of the type of automated activity that the avatar 620 is implementing. In addition to wearing the word "SYS", the avatar 620 also includes the text "55%" above the avatar's 620 head. In embodiments, this may indicate that the automated activity implemented by the avatar 620 is 55% complete, has 55% remaining, is at 55% of capacity, etc.

Similar to avatar 620, avatar 630 also includes a text box above the avatar's 630 head. This text box may indicate, e.g., that the avatar is "89%" complete with the automated activity. In addition to having the text box over its head, avatar 630 is also depicted as a different color than avatar 620. In embodiments this depiction may indicate a number of things, such as, e.g., the number of errors that have occurred during the implementation of the automated activity.

FIG. 6 also includes avatars 640, which are separated from avatars 620 and 630. In embodiments, these avatars 640 may represent inactive avatars, i.e., avatars that are not currently implementing an automated activity. One or more of these avatars 640 may become active when given an automated activity. When an automated activity is complete, the avatar that implemented the automated activity may become inactive. Thus, for example, when avatar 630 completes its automated activity, avatar 630 may become inactive and join avatars 640.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system implemented in hardware comprising:
a processor;
a computer readable hardware storage device;
program instructions stored on the computer readable hardware storage device which, when executed by the processor, perform operations comprising:
displaying a virtual representation of at least one automated activity occurring in a first environment, wherein the at least one automated activity involves a system in the first environment, and wherein the first environment is a real-world environment, and
displaying and rendering a representation of the at least one automated activity in a second environment using a computer-controlled avatar that interacts with a representation of the system in the second environment, wherein the second environment is a virtual universe (VU), which is an interactive simulated environment accessed by users through an online interface, and the users inhabit and interact in the VU via user avatars which are representations of the users,
receiving, by the computer-controlled avatar, the at least one automated activity from a user via a user avatar that represents the user;
monitoring information generated in the first environment in association with a progress of the at least one automated activity occurring in the first environment;
altering at least one of an appearance and a movement of the computer-controlled avatar in the VU to represent the progress of the at least one automated activity based on the information generated in the first environment;
wherein the rendering the representation of the at least one automated activity in the second environment using the computer-controlled avatar comprises displaying a name of the at least one automated activity given to the computer-controlled avatar by the user avatar;
altering the appearance of the computer-controlled avatar comprising:
displaying a percentage complete for the at least one automated activity; and
changing a color of the computer-controlled avatar based on the percentage completed of the at least one automated activity, wherein:
the changing the color and the altering the appearance of the computer-controlled avatar occurs periodically;
the system is a datacenter;
components of the system rendered in the VU are a software package and a system object;
the virtual representation of the at least one automated activity occurring in the first environment represents installing the software package on the system object by the computer-controlled avatar; and
the user avatar represents an administrator of the datacenter;
identifying a number of errors incurred by the at least one automated activity; and
changing at least one of the color and the appearance of the computer-controlled avatar based on the number of errors.

2. The system of claim 1, wherein the at least one automated activity is a biological activity.

3. The system of claim 1, wherein the altering at least one of the appearance and the movement of the computer-controlled avatar comprises updating at least one of the appearance and the movement of the computer-controlled avatar on a synchronous basis or on an event driven basis.

4. The system of claim 1, wherein the receiving the at least one automated activity comprises displaying the user avatar and the computer-controlled avatar interacting by: shaking hands, hugging, handing the computer-controlled avatar a virtual representation of the at least one automated activity, or issuing a command to the computer-controlled avatar.

5. The system of claim 1, the operations further comprising displaying one or more interactions between the computer-controlled avatar and another avatar associated with another automated activity occurring in the first environment, the one or more interactions comprising a gesture to visually represent an end of the at least one automated activity and a beginning of the another automated activity, wherein the at least one automated activity involves a plurality of components in the first environment affected by the at least one automated activity, and a display engine is further configured to render a representation of each of the plurality of components affected by the at least one automated activity.

6. The system of claim 5, the operations further comprising: changing the color of the computer-controlled avatar and a speed at which the computer-controlled avatar is moving to indicate a speed at which the at least one automated activity is being executed; and changing the color of the computer-controlled avatar based on an importance and a criticality of the at least one automated activity.

7. The system of claim 1, the operations further comprising: rendering the computer-controlled avatar using an avatar representing an importance of the at least one automated activity received by from the user.

8. The system of claim 7, the operations further comprising: receiving, by a second computer-controlled avatar, a second automated activity from the user via the user avatar; rendering the second computer-controlled avatar using an avatar representing an importance of the second automated activity received from the user; and simultaneously displaying, to the user, a view of the at least one automated activity and the second automated activity being executed on components of the system by the computer-controlled avatar and the second computer-controlled avatar in the virtual environment, wherein: the receiving the at least one automated activity comprises receiving, by a first one of a plurality of inactive avatars, the at least one automated activity from the user avatar; and the importance of the at least one automated activity received by from the user is represented by a species of the computer-controlled avatar; the receiving the second automated activity comprises receiving, by a second one of the plurality of inactive avatars, the second automated activity from the user avatar; and the importance of the second automated activity received by from the user is represented by a species and/or size of the second computer-controlled avatar.

9. A computer implemented method for visualizing one or more automated activities, comprising:
receiving, by at least one computer-controlled avatar in a virtual environment, one or more automated activities occurring in a real-world environment, wherein:
the at least one computer-controlled avatar receives the one or more automated activities from a user via an interaction in the virtual environment with a user-controlled avatar that represents the user, and
the one or more automated activities involve a system in the real-world environment;
installing a monitoring agent in the one or more automated activities occurring in the real world environment;
rendering the at least one computer-controlled avatar using an avatar representing an importance of the one or more automated activities received from the user;
representing the one or more automated activities occurring in the real-world environment via the at least one computer-controlled avatar in the virtual environment, wherein the at least one computer-controlled avatar implements the one or more automated activities by interacting with a representation of the system;
monitoring the at least one computer-controlled avatar;
altering the at least one computer-controlled avatar to reflect a change in the one or more automated activities occurring in the real-world environment, the altering including changing a color of the at least one computer-controlled avatar and a speed at which the at least one computer-controlled avatar is moving to indicate a speed at which the one or more automated activities are being executed in the real-world environment;
identifying a number of errors incurred by the one or more automated activities;
changing at least one of the color and an appearance of the at least one computer-controlled avatar based on the number of errors;
wherein the rendering the at least one computer-controlled avatar comprises displaying a name of the one or more automated activities given to the at least one computer-controlled avatar by the user-controlled avatar;
altering the appearance of the at least one computer-controlled avatar comprising:
displaying a percentage complete for the one or more automated activities; and
changing the color of the at least one computer-controlled avatar based on the percentage completed of the one or more automated activities; and
wherein:
the changing the color and altering the appearance of the at least one computer-controlled avatar occurs periodically;
the system is a datacenter;
components of the system rendered in the VU are a software package and a system object;
a virtual representation of the one or more automated activities occurring in a real-world environment represents installing the software package on the system object by the at least one computer-controlled avatar; and
the user-controlled avatar represents an administrator of the datacenter.

10. The computer implemented method of claim 9, wherein the altering the at least one computer-controlled avatar includes changing a size of the at least one computer-controlled avatar.

11. The computer implemented method of claim 9, further comprising identifying a percentage complete for the one or more automated activities.

12. The computer implemented method of claim 9, further comprising displaying, to the user, a view of the at least one computer-controlled avatar while performing the one or more automated activities.

13. The computer implemented method of claim 9, wherein the computer implemented method is at least one of supported, deployed, maintained, and created by a service provider.

14. The computer implemented method of claim 9, wherein the computer implemented method is offered by a service provider based on one of a fee and subscription basis.

15. The computer implemented method of claim 9, further comprising: monitoring a progress of the one or more automated activities; and changing at least one of a color, a speed, and a size of the at least one computer-controlled avatar to represent the progress of the one or more automated activities, wherein: the receiving one or more automated activities comprises receiving, by a first one of a plurality of inactive avatars, the one or more automated activities from the user-controlled avatar; and the importance of the one or more automated activities received from the user-controlled avatar is represented by a species of the at least one computer-controlled avatar.

16. A computer program product comprising a tangible computer readable hardware storage device and program instructions stored on the computer readable hardware storage device which, when executed by a processor, perform operations comprising:
receiving, by at least one computer-controlled avatar in a first environment, one or more automated activities occurring in a second environment given to the at least one computer-controlled avatar from a user via a user avatar that represents the user, wherein the one or more automated activities involves a real-world system;

rendering the at least one computer-controlled avatar using an avatar representing an importance of the one or more automated activities received from the user;

depicting the one or more automated activities via the at least one computer-controlled avatar in the first environment, wherein:

the depicting the one or more automated activities includes displaying the at least one computer-controlled avatar implementing the one or more automated activities by interacting with a representation of the real-world system, and the first environment is a virtual universe (VU) which is an interactive simulated environment accessed by users through an online interface, the users inhabiting and interacting in the VU via user avatars which are representations of the users and wherein the second environment is a real-world environment;

monitoring a progress of the one or more automated activities occurring in the second environment through the at least one computer-controlled avatar;

changing one or more features of the at least one computer-controlled avatar to reflect the progress of the one or more automated activities occurring in the second environment, identifying a number of errors incurred by the one or more automated activities;

changing at least one of a color and an appearance of the at least one computer-controlled avatar based on the number of errors;

altering the at least one computer-controlled avatar to reflect a change in the one or more automated activities;

wherein the rendering the at least one computer-controlled avatar comprises displaying a name of the one or more automated activities given to the at least one computer-controlled avatar by the user avatar;

altering the at least one computer-controlled avatar comprising:

displaying a percentage complete for the one or more automated activities; and changing the color of the at least one computer-controlled avatar based on the percentage completed of the one or more automated activities; and wherein:

the changing the color and the appearance of the at least one computer-controlled avatar occurs periodically;

the real-world system is a datacenter;

components of the real-world system rendered in the VU are a software package and a system object;

a virtual representation of the one or more automated activities occurring in the second environment represents installing the software package on the system object by the at least one computer-controlled avatar; and the user avatar represents an administrator of the datacenter.

17. The computer program product of claim 16, wherein the one or more features include at least one of a size, a color, and a movement.

18. The computer program product of claim 16, wherein the one or more automated activities is a biological activity.

19. The computer program product of claim 16, wherein a plurality of the one or more features are depicted by a single avatar.

20. The computer program product of claim 16, wherein the computer program product is at least one of supported, deployed, maintained, and created by a service provider.

21. The computer program product of claim 16, wherein the computer program product is offered by a service provider based on one of a fee and subscription basis.

22. The computer program product of claim 16, the operations further comprising:

installing a monitoring agent in the one or more automated activities that monitors the progress of the one or more automated activities, and changing at least one of a color, a speed, and a size of the at least one computer-controlled avatar to represent the progress of the one or more automated activities, wherein:

the receiving one or more automated activities comprises receiving, by a first one of a plurality of inactive avatars, the one or more automated activities from the user; and the importance of the one or more automated activities received from the user is represented by a species of the at least one computer-controlled avatar.

23. A method for deploying an application for visualizing one or more automated activities, comprising:

receiving, by at least one computer-controlled avatar in a first environment, one or more automated activities occurring in a second environment, wherein:

the at least one computer-controlled avatar receives the one or more automated activities from a user avatar that represents a user in the first environment, the one or more automated activities involve a real-world system, and the first environment is a virtual universe (VU), which is an interactive simulated environment accessed by users through an online interface, the users inhabiting and interacting in the VU via user avatars which are representations of the users and the second environment is a real-world environment;

associating the one or more automated activities occurring in the second environment with the at least one computer-controlled avatar in the first environment;

rendering the at least one computer-controlled avatar using an avatar representing an importance of the one or more automated activities received by from the user;

monitoring a status of the one or more automated activities occurring in the second environment through a monitoring agent;

altering the at least one computer-controlled avatar in relation to a progress of the automated activity occurring in the second environment;

displaying the status of the one or more automated activities occurring in the second environment via the at least one computer-controlled avatar, wherein the displaying includes controlling the at least one computer-controlled avatar to interact with a representation of the real-world system;

identifying a number of errors incurred by the one or more automated activities;

changing at least one of a color and an appearance of the at least one computer-controlled avatar based on the number of errors;

wherein the rendering the at least one computer-controlled avatar comprises displaying a name of the one or more automated activities given to the at least one computer-controlled avatar by the user avatar;

altering the at least one computer-controlled avatar comprising:
 displaying a percentage complete for the one or more automated activities; and
 changing the color of the at least one computer-controlled avatar based on the percentage completed of the one or more automated activities; and
wherein:
 the changing the color and the appearance of the at least one computer-controlled avatar occurs periodically;
 the real-world system is a datacenter;
 components of the real-world system rendered in the VU are a software package and a system object;
 a virtual representation of the one or more automated activities occurring in the second environment represents installing the software package on the system object by the at least one computer-controlled avatar; and
 the user avatar represents an administrator of the datacenter.

24. The method of claim 23, further comprising altering at least one of a size, a color, and a movement of the at least one computer-controlled avatar based on the status of the one or more automated activities.

25. The method of claim 24, wherein the altering is performed on a synchronous basis or on an event driven basis.

26. The method of claim 23, wherein the one or more automated activities is a biological activity.

* * * * *